United States Patent
Roberts, Jr. et al.

(10) Patent No.: US 9,602,459 B2
(45) Date of Patent: *Mar. 21, 2017

(54) SELECTABLE MODE BASED SOCIAL NETWORKING INTERACTION SYSTEMS AND METHODS

(71) Applicant: Verizon Patent and Licensing Inc., Arlington, VA (US)

(72) Inventors: Brian F. Roberts, Jr., Dallas, TX (US); Donald H. Relyea, Dallas, TX (US); Michelle Felt, Randolph, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 348 days.

This patent is subject to a terminal disclaimer.

(21) Appl. No.: 14/312,510

(22) Filed: Jun. 23, 2014

(65) Prior Publication Data

US 2014/0304405 A1    Oct. 9, 2014

Related U.S. Application Data

(63) Continuation of application No. 12/211,660, filed on Sep. 16, 2008, now Pat. No. 8,762,459.

(51) Int. Cl.

| G06F 15/173 | (2006.01) |
|---|---|
| H04L 12/58 | (2006.01) |
| G06Q 10/10 | (2012.01) |
| H04L 29/08 | (2006.01) |

(52) U.S. Cl.
CPC ............. *H04L 51/32* (2013.01); *G06Q 10/10* (2013.01); *H04L 67/14* (2013.01)

(58) Field of Classification Search
CPC ...................................................... H04L 51/32
See application file for complete search history.

(56) References Cited

U.S. PATENT DOCUMENTS

| 7,020,480 | B2 | 3/2006 | Coskun et al. |
|---|---|---|---|
| 8,125,508 | B2 | 2/2012 | Kenoyer |
| 8,190,119 | B2 | 5/2012 | Jabara et al. |
| 8,244,589 | B2 | 8/2012 | Vincent et al. |
| 8,295,803 | B2 | 10/2012 | Jabara et al. |
| 2004/0046656 | A1 | 3/2004 | Schaefer et al. |
| 2005/0177614 | A1 | 8/2005 | Bourne |
| 2005/0188018 | A1 | 8/2005 | Endo et al. |
| 2007/0188596 | A1 | 8/2007 | Kenoyer |
| 2008/0065486 | A1 | 3/2008 | Vincent et al. |
| 2008/0086261 | A1 | 4/2008 | Robinson et al. |
| 2008/0140650 | A1 | 6/2008 | Stackpole |
| 2008/0208971 | A1 | 8/2008 | Costin et al. |
| 2009/0094169 | A1 | 4/2009 | Kim et al. |
| 2009/0204661 | A1 | 8/2009 | Endo et al. |
| 2010/0227610 | A1 | 9/2010 | Jabara et al. |
| 2011/0246611 | A1 | 10/2011 | Jabara et al. |
| 2012/0176467 | A1 | 7/2012 | Kenoyer |

*Primary Examiner* — Brian P Whipple

(57) ABSTRACT

An exemplary method includes at least one computing device maintaining data representative of a user profile associated with a first user of a first mobile device, detecting that the first mobile device and a second mobile device associated with a second user are located in a geographic vicinity, determining, in response to the detecting that the first mobile device and the second mobile are located in the geographic vicinity, that the second user matches at least one criterion defined within the user profile associated with the first user, and automatically storing, in response to the determining, contact information corresponding to the second user.

20 Claims, 10 Drawing Sheets

SELECTABLE MODE BASED SOCIAL NETWORKING INTERACTION SYSTEMS AND METHODS

RELATED APPLICATIONS

This application is a continuation application of U.S. patent application Ser. No. 12/211,660, filed Sep. 16, 2008, and entitled SELECTABLE MODE BASED SOCIAL NETWORKING INTERACTION SYSTEMS AND METHODS, which is hereby incorporated by reference in its entirety.

BACKGROUND INFORMATION

Advances in electronic communications technologies have interconnected people and allowed for distribution of information perhaps better than ever before. To illustrate, social networking applications, which allow people to virtually connect with one another, have become enormously popular.

One downfall associated with current social networking applications is that the users thereof must be engaged with their computers in order to participate. This inhibits the ability of users to utilize social networking applications in many real-world settings where they may not have direct access to their computers.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
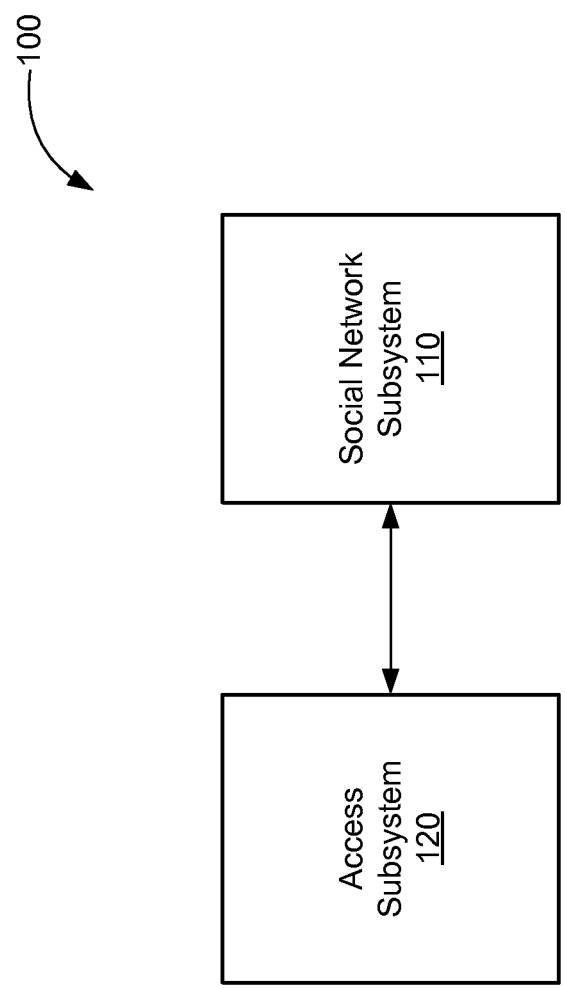
FIG. 1 illustrates an exemplary social networking system according to principles described herein.

Selectable mode based social networking interaction systems and methods are described herein.

An exemplary method includes maintaining data representative of a user profile associated with a user, facilitating a social networking interaction between the user and at least one other user, and controlling the social networking interaction between the user and the at least one other user based on information contained within the user profile and in accordance with a selectable mode. As used herein, a "mode" refers to a particular manner in which a social networking facility is configured to operate. Exemplary modes include, but are not limited to, "mingle mode", "entourage mode", "arrival mode", and "secret friends" mode. Each of these modes will be described in more detail below.

Another exemplary method includes facilitating a social networking interaction between a user and at least one other user, detecting a geographic location of at least one of the user and the at least one other user, and controlling the social networking interaction between the user and the at least one other user in response to the detected geographic location and in accordance with a selectable mode.

An exemplary system includes a storage facility configured to maintain data representative of a user profile associated with a user and a social networking facility configured to direct a processing facility to facilitate a social networking interaction between the user and at least one other user. The social networking facility is further configured to control the social networking interaction between the user and the at least one other user based on information contained within the user profile and in accordance with a selectable mode.

Another exemplary system includes a social networking facility configured to direct a processing facility to facilitate a social networking interaction between a user and at least one other user and a location detection facility configured to detect a geographic location of at least one of the user and the at least one other user. The social networking facility is further configured to control the social networking interaction between the user and the at least one other user in response to the detected geographic location and in accordance with a selectable mode.

In some examples, an access subsystem associated with a user may be selectively and communicatively coupled to a social network subsystem over a network. The access subsystem may include a social networking facility configured to facilitate a social networking interaction between the user and at least one other user. The social networking facility may be further configured to control the social networking interaction between the user and the at least one other user based on information contained within a user profile corresponding to the user and in accordance with a selectable mode.

Exemplary embodiments of selectable mode based social networking interaction systems and methods will now be described in more detail with reference to the accompanying drawings.

FIG. 1 illustrates an exemplary social networking system 100 (or simply "system 100"). As shown in FIG. 1, system 100 may include a social network subsystem 110 and an access subsystem 120 configured to communicate with one another.

Access subsystem 120 and social network subsystem 110 may communicate using any communication platforms and technologies suitable for transporting data representative of content, content metadata, content management commands, and/or other communications, including known communication technologies, devices, media, and protocols supportive of remote or local data communications. Example of such communication technologies, devices, media, and protocols include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), Evolution Data Optimized Protocol ("EVDO"), radio frequency ("RF") signaling technologies, signaling system seven ("SS7") technologies, Ethernet, in-band and out-of-band signaling technologies, and other suitable communications networks and technologies.

In some examples, system 100 may include any computer hardware and/or instructions (e.g., software programs), or combinations of software and hardware, configured to perform the processes described herein. In particular, it should be understood that components of system 100 may be implemented on one physical computing device or may be implemented on more than one physical computing device. Accordingly, system 100 may include any one of a number of computing devices, and may employ any of a number of computer operating systems.

Accordingly, the processes described herein may be implemented at least in part as computer-executable instructions, i.e., instructions executable by one or more computing devices, tangibly embodied in a computer-readable medium. In general, a processor (e.g., a microprocessor) receives instructions, e.g., from a memory, a computer-readable medium, etc., and executes those instructions, thereby performing one or more processes, including one or more of the processes described herein. Such instructions may be stored and transmitted using a variety of known computer-readable media.

A computer-readable medium (also referred to as a processor-readable medium) includes any medium that participates in providing data (e.g., instructions) that may be read by a computer (e.g., by a processor of a computer). Such a medium may take many forms, including, but not limited to, non-volatile media, volatile media, and transmission media. Non-volatile media may include, for example, optical or magnetic disks and other persistent memory. Volatile media may include, for example, dynamic random access memory ("DRAM"), which typically constitutes a main memory. Transmission media may include, for example, coaxial cables, copper wire and fiber optics, including the wires that comprise a system bus coupled to a processor of a computer. Transmission media may include or convey acoustic waves, light waves, and electromagnetic emissions, such as those generated during radio frequency ("RF") and infrared ("IR") data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Figure 2:
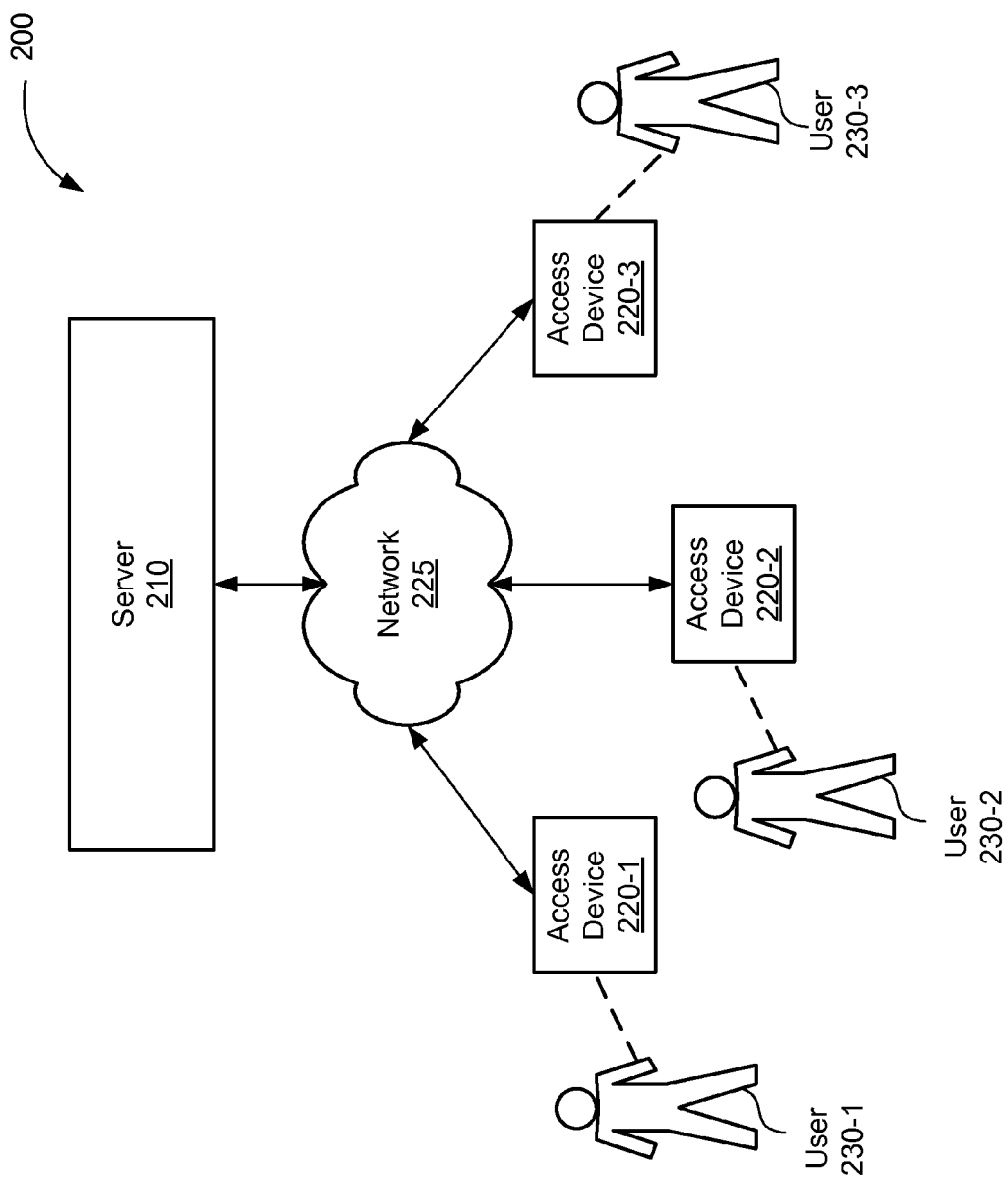
FIG. 2 shows an exemplary implementation of the system of FIG. 1 according to principles described herein.

FIG. 2 shows an exemplary implementation 200 of system 100. In implementation 200, social network subsystem 110 may include or be implemented within at least one server 210, and access subsystem 120 may include or be implemented within at least one access device (e.g., access devices 220-1 through 220-3, collectively referred to herein as "access devices 220") configured to communicate with server 210 by way of a network 225. Network 225 may include one or more networks, including, but not limited to, wireless networks, mobile telephone networks (e.g., cellular telephone networks), closed media networks, subscriber television networks, cable networks, satellite networks, the Internet, intranets, local area networks, public networks, private networks, optical fiber networks, broadband networks, narrowband networks, voice communications networks, Voice over Internet Protocol "(VoIP") networks, Public Switched Telephone Networks ("PSTN"), and any other networks capable of carrying data representative of content, data associated with content (e.g., metadata), data management commands, and/or communications signals between access devices 220 and server 210. Communications between server 210 and access devices 220 may be transported using any one of above-listed networks, or any combination or sub-combination of the above-listed networks.

Each access device 220 may include any device configured to perform one or more of the processes described herein, including communicating with and/or transmitting and receiving content, data associated with content (e.g., metadata), social networking commands, and/or content operation commands to/from social network subsystem 110 by way of network 225. Access device 120 may include, but is not limited to, a computing device (e.g., a desktop or laptop computer), a set-top box, a communication device, a wireless computing device, a wireless communication device (e.g., a mobile phone), a Global Positioning System ("GPS") device, a personal digital assistant, a content recording device (e.g., a camera, audio recorder, video camera), a vehicular computing and/or communication device, a content-enabled device, a gaming device, and/or any other device configured to perform one or more social networking interactions and/or acquire, transmit, receive, access, or otherwise process content.

As shown in FIG. 2, each access device 220 may be associated with at least one user (e.g., users 230-1 through 230-3, collectively referred to herein as "users 230"). As will be described in more detail below, each user 230 may virtually connect or otherwise communicate or interact with other users 230 using social networking subsystem 110. Moreover, each user 230 may provide and/or access content stored within social network subsystem 110 via one or more of the access devices 220.

In some examples, one or more of the users 230 may be subscribers to or users of one or more services provided over network 225. For example, one or more of the users 230 may be subscribers to a particular social networking service and/or a wireless telephone service. Other services may be provided over network 225 as may serve a particular application.

Social network subsystem 110 may be configured to support communication with access subsystem 120 via multiple network platforms. For example, user 230 may utilize multiple access devices 220, each a part of a different network platform, to interact with social network subsystem 110.

Figure 3:
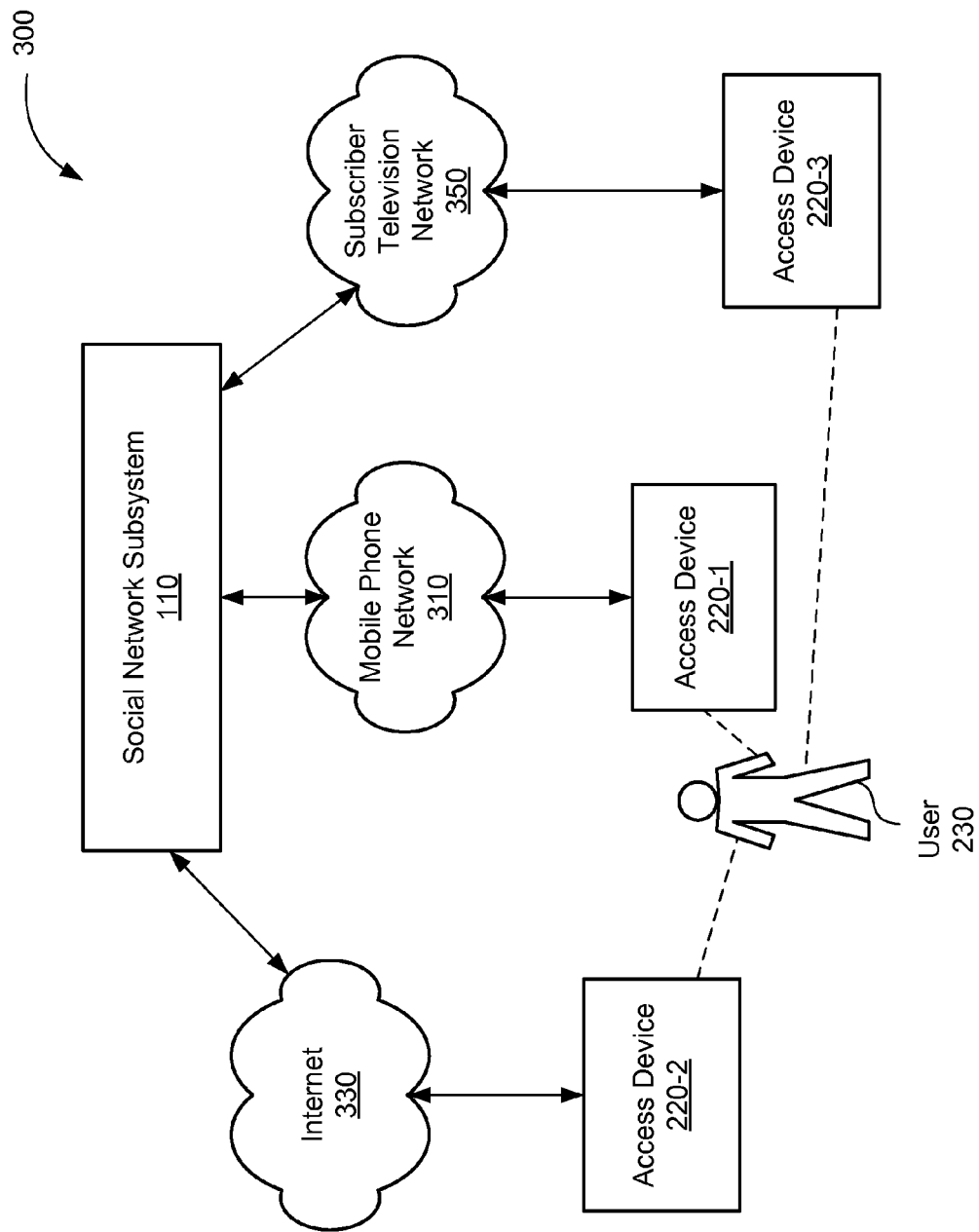
FIG. 3 shows another exemplary implementation of the system of FIG. 1 according to principles described herein.

To illustrate, FIG. 3 shows an exemplary implementation 300 of system 100. As shown in FIG. 3, the implementation 300 may include social network subsystem 110 and access devices 220-1 through 220-3 associated with user 230.

Social network subsystem 110 may be configured to communicate with each access device 220 over a different network platform. For example, social network subsystem 110 may be configured to communicate with access device 220-1 (e.g., a mobile phone) over a mobile phone network 310, with access device 220-2 (e.g., a personal computer) over the Internet 330, and/or with access device 220-3 (e.g., a set-top box) over subscriber television network 350. Hence, user 230 may be able to utilize any of the access devices 220-1 through 220-3 to provide and/or access content stored within and/or access social networking services provided by social network subsystem 110. It will be recognized that mobile phone network 310, the Internet 330, and subscriber television network 350 may be part of network 225 shown in FIG. 2. It will also be recognized that the networks shown in FIG. 3 are merely illustrative of the many different types of networks that may facilitate communication between social network subsystem 110 and access subsystem 120.

Figure 4:
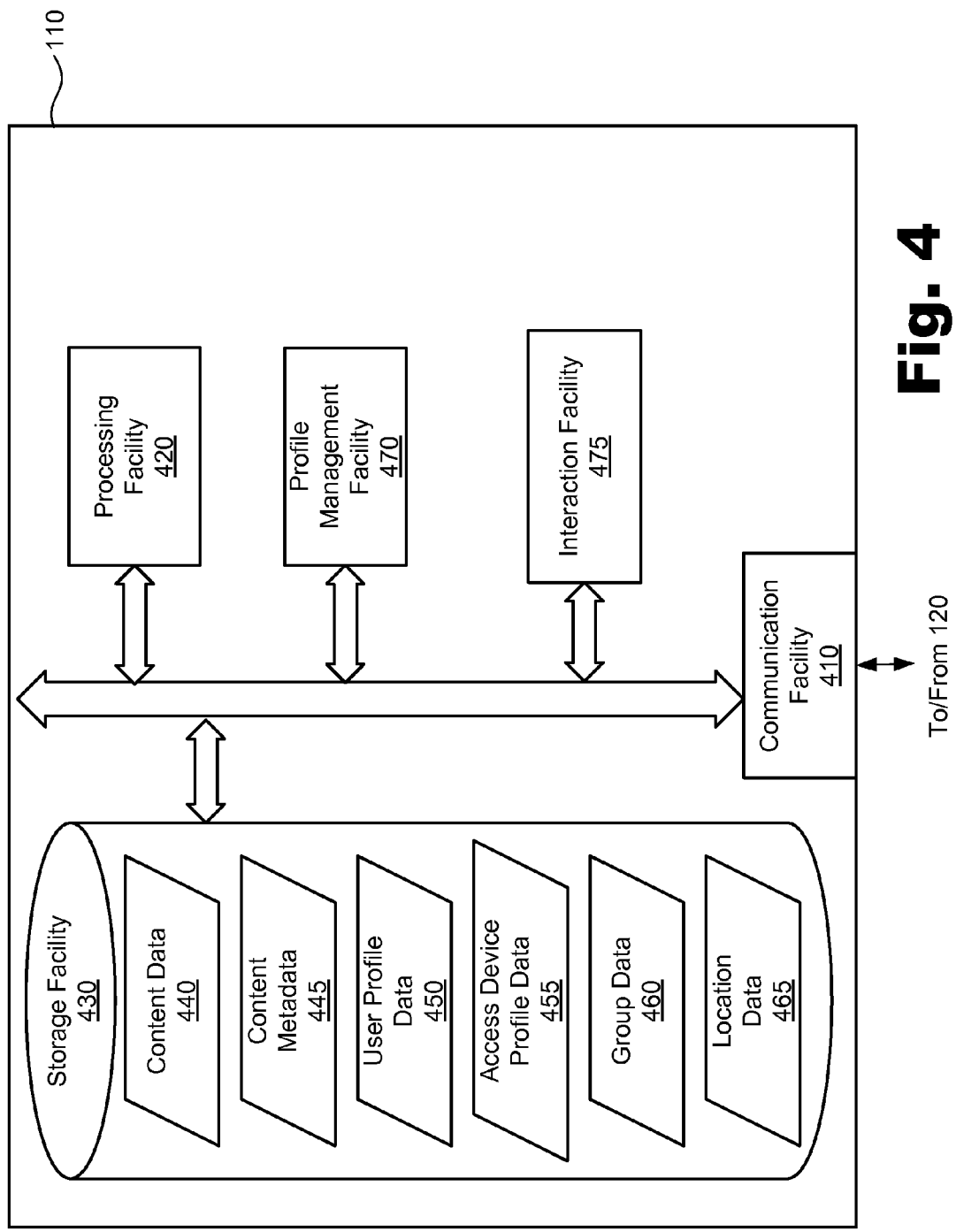
FIG. 4 illustrates components of an exemplary social network subsystem according to principles described herein.

FIG. 4 illustrates components of an exemplary social network subsystem 110. The components of social network subsystem 110 may include or be implemented as hardware, computing instructions (e.g., software) embodied on a computer-readable medium, or a combination thereof. In certain embodiments, for example, one or more components of social network subsystem 110 may include or be implemented on one or more servers, such as server 210, configured to communicate over network 225. While an exemplary social network subsystem 110 is shown in FIG. 4, the exemplary components illustrated in FIG. 4 are not intended to be limiting. Indeed, additional or alternative components and/or implementations may be used.

As shown in FIG. 4, social network subsystem 110 may include a communication facility 410, which may be configured to communicate with access subsystem 120, including receiving data representative of content, data representative of social networking commands, and content data operations from access subsystem 120 and/or any other device or subsystem. Communication facility 410 may additionally or alternatively be configured to transmit content, social networking commands, and/or any other data to access subsystem 120 and/or any other device or subsystem by way of network 225. The communication facility 410 may include and/or support any suitable communication platforms and technologies for communicating with and transporting content and associated data to/from access subsystem 120. Communication facility 410 may be configured to support a variety of communication platforms, protocols, and formats such that social network subsystem 110 can receive data from and distribute data to a variety of computing platforms (e.g., a mobile telephone service platform, a web-based platform, a subscriber television platform, etc.) using a variety of communications technologies. Accordingly, the social network subsystem 110 may be configured to support a multi-platform system in which data can be received from and provided to diverse platforms.

Social network subsystem 110 may include a processing facility 420 configured to control operations of components of the social network subsystem 110. Processing facility 420 may execute or direct execution of operations in accordance with computer-executable instructions stored to a computer-readable medium such as a storage facility 430. As an example, processing facility 420 may be configured to process data and/or communications received from or to be transmitted to access subsystem 120.

In some examples, processing facility 420 may be configured to perform device-specific content formatting before content is provided to (e.g., downloaded by) a particular access device 220. In this manner, the content may be optimally viewed or otherwise experienced by a user of the access device 220.

Storage facility 430 may include one or more data storage media, devices, or configurations and may employ any type, form, and combination of storage media. For example, the storage facility 430 may include, but is not limited to, a hard drive, network drive, flash drive, magnetic disc, optical disc, random access memory ("RAM"), dynamic RAM ("DRAM"), other non-volatile and/or volatile storage unit, or a combination or sub-combination thereof. Storage facility 430 may store any suitable type or form of electronic data, including content data 440, content metadata 445, user profile data 450, access device profile data 455, group data 460, and/or location data 465.

Content data 440 may include or be stored within one or more content instances. As used herein, the term "content instance" refers generally to any data record or object (e.g., an electronic file) storing or otherwise associated with content, which may include electronic data representative of text, one or more messages (e.g., short message service ("SMS") messages, electronic mail messages, or multimedia message service ("MMS") messages), one or more symbols, one or more graphics, one or more images (e.g., digital photographs and video frames), email contacts, video, audio, multimedia, video games, or any segment, component, or combination of these or other forms of electronic data that may be viewed or otherwise experienced by a user. Content metadata 445 may include metadata associated with one or more of the content instances.

User profile data 450 may include any information descriptive of one or more users who are associated with social network subsystem 110 and/or otherwise receive services provided over network 225. User profile data 450 may include user authentication information, user identifiers, information about one or more access devices 120 that correspond with a user 230, user preferences, and/or any other information related to one or more users. User profile data 450 corresponding to a particular user 230 may additionally or alternatively include contact information corresponding to one or more users 230 virtually connected to or otherwise associated with the user 230. As will be described in more detail below, social network subsystem 110 and/or access subsystem 120 may be configured to control one or more social networking interactions between users 230 based at least in part on user profile data 450 corresponding to the users 230.

Access device profile data 455 may include any information descriptive of access subsystem 120 and/or any access device 220 configured to communicate with social network subsystem 110. For example, access device profile data 455 may include data representative of one or more access device identifiers, network addresses (e.g., internet protocol ("IF") addresses), network resources, computing resources, subscription information, device permissions, platforms, etc.

Group data 460 may include any information that can be used to identify groupings of users 230 and/or access devices 220. For example, group data 460 may include information indicating that certain users 230 are members of a group within a particular social network. Accordingly, group data 460 may be useful for facilitating selective access of content data 440 by users 230 within a group and/or selective communications between users 230 within a group. In certain embodiments, group data 460 may include information that can be used to access user profile data 450 corresponding to users in a group, and the user profile data 450 may include information that can be used to identify user associations with access devices 120.

Group data 460 may be defined in any suitable manner, including users (e.g., a member of a particular social network) defining groups and providing data representative of the defined groups to social network subsystem 110. For example, a user may specify one or more social networking connections and provide the social networking connections to social network subsystem 110 in the form of group data 460. In certain embodiments, at least certain groups are defined based on user subscription accounts for services provided over network 225. For example, a default group may be defined by social network subsystem 110 to include any users associated with a subscription account (e.g., a social networking account).

Location data 465 may include any data representative of a detected geographic location of one or more access devices 220. Exemplary location data 465 may include GPS coordinates, trilateration data, and/or any other data representative of a geographic location. As will be described in more detail below, location data 465 may be used by social network subsystem 110 and/or access subsystem 120 to facilitate and/or control various social interactions between users 230.

In certain embodiments, data 440-465 may be stored using one or more suitable data entities and/or structures, including one or more relational or hierarchical data tables, for example.

Social network subsystem 110 may include a profile management facility 470, which may be configured to manage one or more user profiles and/or access device profiles and/or maintain a database of permissions associated therewith. For example, profile management facility 470 may be configured to facilitate updating of a user profile and/or an access device profile by a user. In some examples, one or more user profiles and/or access device profiles may be managed within the access subsystem 120.

Social network subsystem 110 may further include an interaction facility 475, which may be configured to provide one or more functions configured to facilitate social networking interactions between users 230. Exemplary functions that may be provided by interaction facility 475 may include, but are not limited to, providing interfaces wherein users 230 may virtually interact with each other, making content accessible to different users 230 within a particular social network or group, providing content recommendations to one or more users 230, maintaining one or more databases of user permissions and/or privileges, and/or any other function associated with social networking.

Interaction facility 475 may include or be implemented as hardware, computing instructions (e.g., software) tangibly embodied on a computer-readable medium, or a combination of hardware and computing instructions configured to perform one or more of the processes described herein. In certain embodiments, interaction facility 475 may be implemented as a software application embodied on a computer-readable medium such as storage facility 430 and configured to direct the processing facility 420 to execute one or more of the processes described herein.

Figure 5:
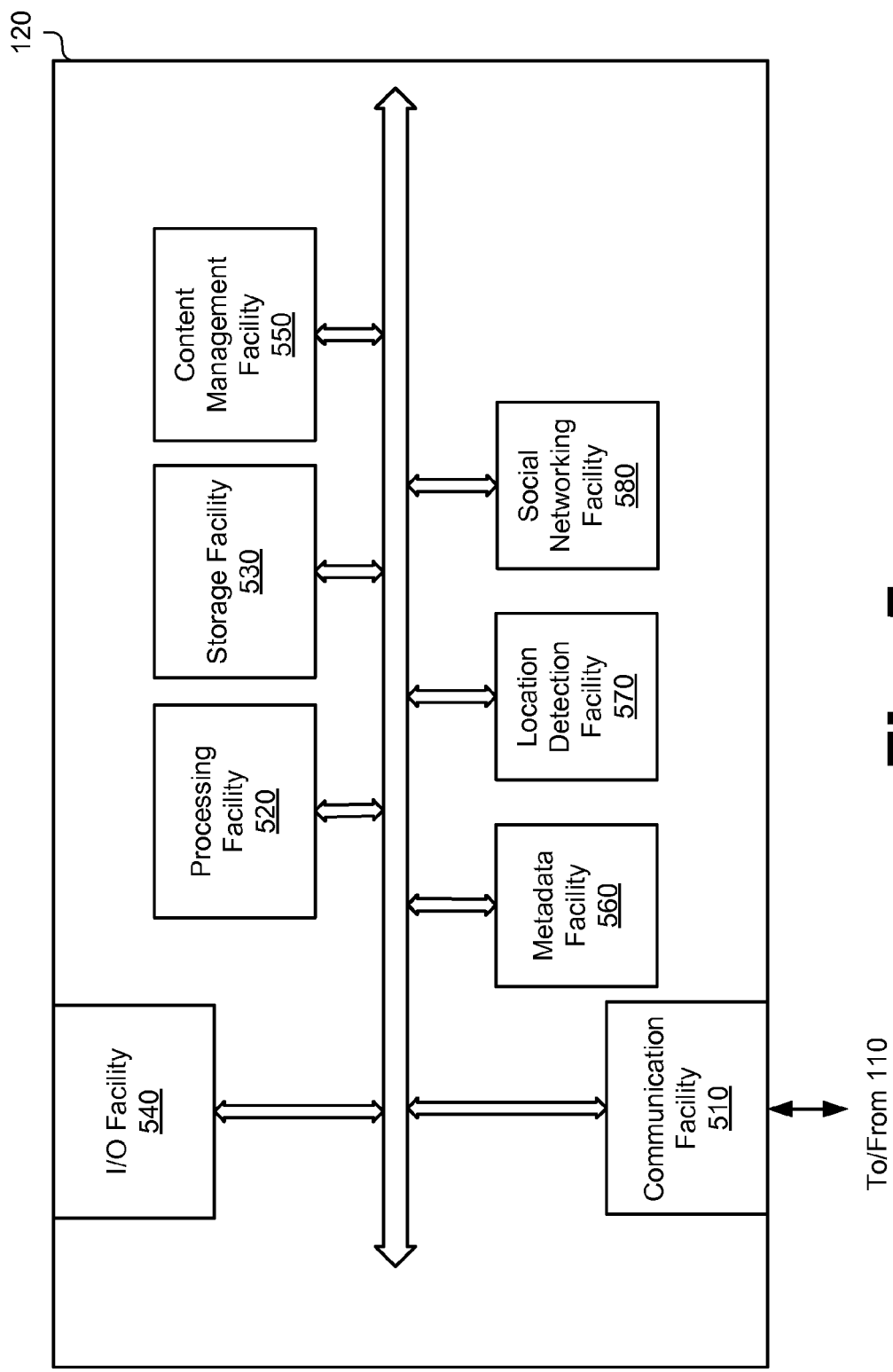
FIG. 5 illustrates components of an exemplary access subsystem according to principles described herein.

FIG. 5 illustrates components of an exemplary access subsystem 120. As shown in FIG. 5, access subsystem 120 may include a communication facility 510, processing facility 520, storage facility 530, input/output ("I/O") facility 540, content management facility 550, metadata facility 560, location detection facility 570, and social networking facility 580 communicatively connected to one another. The facilities 510-580 may be communicatively connected using any suitable technologies. Each of the facilities 510-580 may be implemented as hardware, computing instructions (e.g., software) tangibly embodied on a computer-readable medium, or a combination of hardware and computing instructions configured to perform one or more of the processes described herein. In certain embodiments, for example, social networking facility 580 and/or one or more other facilities may be implemented as one or more software applications embodied on a computer-readable medium such as storage facility 530 and configured to direct processing facility 520 of the access subsystem 120 and/or processing facility 420 of the social network subsystem 110 to execute one or more of the processes described herein.

Communication facility 510 may be configured to communicate with social network subsystem 110 (e.g., over network 225), including sending and receiving data representative of content, data associated with content, content management commands, social networking commands, and/or other communications to/from social network subsystem 110. Communication facility 510 may include any device, logic, and/or other technologies suitable for transmitting and receiving such data. In certain embodiments, communication facility 510 may be configured to support other network service communications over network 225, including wireless voice, data, and messaging service communications, for example. Communication facility 510 may be configured to interface with any suitable communication media, protocols, formats, platforms, and networks, including any of those mentioned herein.

Processing facility 520 may be configured to execute and/or direct execution of operations of one or more components of the access subsystem 120. Processing facility 520 may direct execution of operations in accordance with computer-executable instructions such as may be stored in storage facility 530 or another computer-readable medium.

Storage facility 530 may include one or more data storage media, devices, or configurations and may employ any type, form, and combination of storage media. For example, the storage facility 530 may include, but is not limited to, a hard drive, network drive, flash drive, magnetic disc, optical disc, random access memory ("RAM"), dynamic RAM ("DRAM"), other non-volatile and/or volatile storage unit, or a combination or sub-combination thereof. Data may be temporarily and/or permanently stored in the storage facility 530.

Different types of data may be maintained within storage facility 530 as may serve a particular application. For example, content data 440, user profile data 450, access device profile data 455, and/or group data 460 may be maintained by storage facility 530. It will be recognized that data stored within storage facility 530 may additionally or alternatively be stored within storage facility 430 and/or within any other storage medium as may serve a particular application.

I/O facility 540 may be configured to receive user input and provide user output and may include any hardware, firmware, software, or combination thereof supportive of input and output capabilities. For example, I/O facility 540 may include one or more devices for capturing or otherwise creating content, including, but not limited to, a still-shot camera, video camera, scanner, microphone, keyboard or keypad, touch screen component, and/or receiver (e.g., an RF or infrared receiver). Accordingly, a user 230 of access subsystem 120 may create or otherwise acquire content (e.g., by taking a picture, creating a word processing document, or downloading a data file). In some examples, the acquired content may be provided to social network subsystem 110 and/or to another access device 220.

I/O facility 540 may include one or more devices for presenting content for experiencing by the user 230, including, but not limited to, a graphics engine, a display, one or more display drivers, one or more audio speakers, and one or more audio drivers. Accordingly, I/O facility 540 may present content (e.g., play back and/or display) for experiencing by the user 230. I/O facility 540 may also be configured to provide other output for the user 230, such as graphical user interfaces.

Content management facility 550 may be configured to provide one or more tools for management of content. The tools may include or be provided using hardware, computer-readable instructions embodied on a computer-readable medium such as storage facility 530, or a combination of hardware and computer-readable instructions. In certain embodiments, content management facility 550 may be implemented as a software application embodied on a computer-readable medium such as storage facility 530 and configured to direct the processing facility 520 of the access subsystem 120 to execute one or more of the content management operations described herein.

The tools may be configured to enable user 230 to create, format, modify, delete, annotate (e.g., edit, rate, label, add a note to, comment about, and categorize content), access, retrieve, copy, move, send, request, receive, decrypt, and/or otherwise manage content stored within access subsystem 120 and/or social network subsystem 110. For example, a user 230 utilizing the content management tools may create and provide a content instance to social network subsystem 110. Through content management facility 550, the user 230 may access and manage the content instance. Content management facility 550 may generate and provide content management commands to social network subsystem 110, which may be configured to receive and process the commands, and to identify and perform appropriate content management operations based on the commands.

In some examples, the one or more tools provided by content management facility 550 may include one or more application clients configured to facilitate access to content stored within or received from social network subsystem 110. Exemplary application clients may include, but are not limited to, Internet browsers, image viewers, media players, and/or document readers and editors.

Metadata facility 560 may be configured to perform operations associated with content metadata, including generating, updating, and providing content metadata. The term "metadata" as used herein refers generally to any electronic data descriptive of content and/or content instances. For example, metadata may include, but is not limited to, content instance identifiers (e.g., file names), time data, location data, user data, source data, destination data, size data, creation data, modification data, data structure data, and access data descriptive of content and/or one or more content instances. Examples of metadata may include time data associated with a data operation (e.g., creating, modifying, deleting, receiving, or sending content), location data associated with a data operation (e.g., a geographic or network location at which content is created), user data identifying one or more users associated with content (e.g., a user who created, modified, deleted, sent, received, accessed, or otherwise operated on or is owner of content), content type information (e.g., file type or other predefined category of content), content transport information, source data associated with a source of content (e.g., a user from whom content is received), and destination data associated with a destination to which content is sent (e.g., a user to whom content is transmitted).

Metadata facility 560 may include hardware, computer-readable instructions embodied on a computer-readable medium such as storage facility 530 (e.g., one or more content management software applications), or a combination of hardware and computer-readable instructions. In certain embodiments, metadata facility 560 may be implemented as a software application embodied on a computer-readable medium such as storage facility 530 and configured to direct the processing facility 520 of the access subsystem 120 to execute one or more of metadata operations described herein.

Metadata facility 560 may be configured to detect content management operations and to generate, update, delete, and/or provide metadata associated with the operations. For example, if a content instance is transmitted to a destination, such as by transmitting data representative of the content instance over network 225, metadata facility 560 may detect the transmission of the content instance and generate and provide metadata indicating a time at which the content instance is sent and the destination to which the content instance is sent (e.g., a user or remote device identifier). Similarly, if another content instance is received by access subsystem 120 from a source (e.g., social network subsystem 110), metadata facility 560 may detect the receipt of the other content instance and generate and provide metadata indicating a time at which the other content instance is received and the source that provided the other content instance.

Location detection facility 570 may include any hardware, computing instructions (e.g., software), or combination thereof configured to detect a geographic location of access subsystem 120. In some embodiments, location detection facility 570 may be configured to utilize GPS technologies to determine the geographic location of the access subsystem 120, which location may be identified in terms of GPS coordinates. Other suitable location detection technologies may be used in other embodiments, including using principles of trilateration to evaluate radio frequency signals received by access subsystem 120 (e.g., RF signals in a wireless phone network or other wireless network) and to estimate the geographic location of the access subsystem 120, ad hoc wifi technologies, Bluetooth technologies, radio frequency identification ("RFID") technologies, and/or any other location detection technologies as may serve a particular application.

Location detection facility 570 may be configured to detect the geographic location of an access subsystem 120 periodically at a predetermined frequency or time, continuously, or in response to a predetermined trigger event. Such a trigger event may include, but is not limited to, receipt of an instruction from social network subsystem 110. In certain embodiments, location detection facility 570 may be configured to continually detect the geographic location of access subsystem 120 (i.e., location detection facility 570 may be configured to be "always on"). In such embodiments, location detection facility 570 may continually detect the location of the access subsystem 120 at a predefined frequency (e.g., every one or two seconds). In some examples, a user 130 of access subsystem 120 may selectively enable location detection operations such as by launching location detection facility 570, for example.

Once location detection facility 570 has detected the geographic location of the access subsystem 120, location detection facility 570 may generate and provide location data 465 (e.g., GPS coordinates) representative of the detected geographic location of the access subsystem 120. The location data 465 may be provided to storage facilities 430 and/or 530 for storage, to social networking facility 580 for processing, and/or to communication facility 510 for transmission to social network subsystem 110 and/or one or more other access devices 220.

In some examples, location detection facility 570 may additionally or alternatively detect a geographic location of one or more other access devices 220, landmarks, or other entities. For example, and as will be described in more detail below, a location detection facility 570 residing within a particular access device 220 may be configured to detect a presence of one or more other access devices 220 within a certain geographic region.

Social networking facility 580 may be configured to facilitate social networking interactions between users 230 in accordance with at least one selectable mode. As mentioned, a "mode" refers to a particular manner in which the social networking facility 580 is configured to operate. Exemplary modes include, but are not limited to, "mingle mode", "entourage mode", "arrival mode", and "secret friends" mode. Each of these modes will be described in more detail below.

In some examples, the particular mode or modes in which the social networking facility 580 operates may be user-selectable. Additionally or alternatively, social networking facility 580 may be configured to automatically switch to or operate in a particular mode in response to a detected location of one or more access devices 220 and/or any other factor as may serve a particular application.

As will be described in more detail below, each mode of operation may be based on information contained within one or more user profiles corresponding to the users 230 and/or geographic locations of one or more access devices 220 associated with the users 230. Various examples of social networking interactions between users 230 will be described in more detail below.

Social networking facility 580 may include hardware, computer-readable instructions embodied on a computer-readable medium such as storage facility 530 (e.g., one or more software applications), or a combination of hardware and computer-readable instructions. In certain embodiments, social networking facility 580 may be implemented as a software application embodied on a computer-readable medium such as storage facility 530 and configured to direct the processing facility 520 of the access subsystem 120 to execute one or more operations described herein. Exemplary actions that may be performed by social networking facility 580 will be described in more detail below. It will be recognized that one or more functions of social networking facility 580 may be additionally or alternatively performed by interaction facility 475 located within social network subsystem 110.

Various features, embodiments, and applications of social networking facility 580 will now be described. It will be recognized that the features, embodiments, and applications described herein are merely illustrative, and that social networking facility 580 may be configured to perform additional or alternative functions as may serve a particular application.

As mentioned, social networking facility 580 may be configured to facilitate one or more social networking interactions between users 230 in accordance with one or more selectable modes. Each mode may be configured to direct the social networking facility 580 to function in a distinct manner. In some examples, social networking facility 580 may be configured to operate in two or more modes simultaneously. Exemplary modes of operation will now be described.

In some examples, a social networking facility 580 associated with an access device 220 may be selectively configured to operate in a "mingle mode," wherein the social networking facility 580 attempts to establish one or more social networking connections with one or more social networking facilities 580 associated with one or more other access devices 220.

Figure 6:
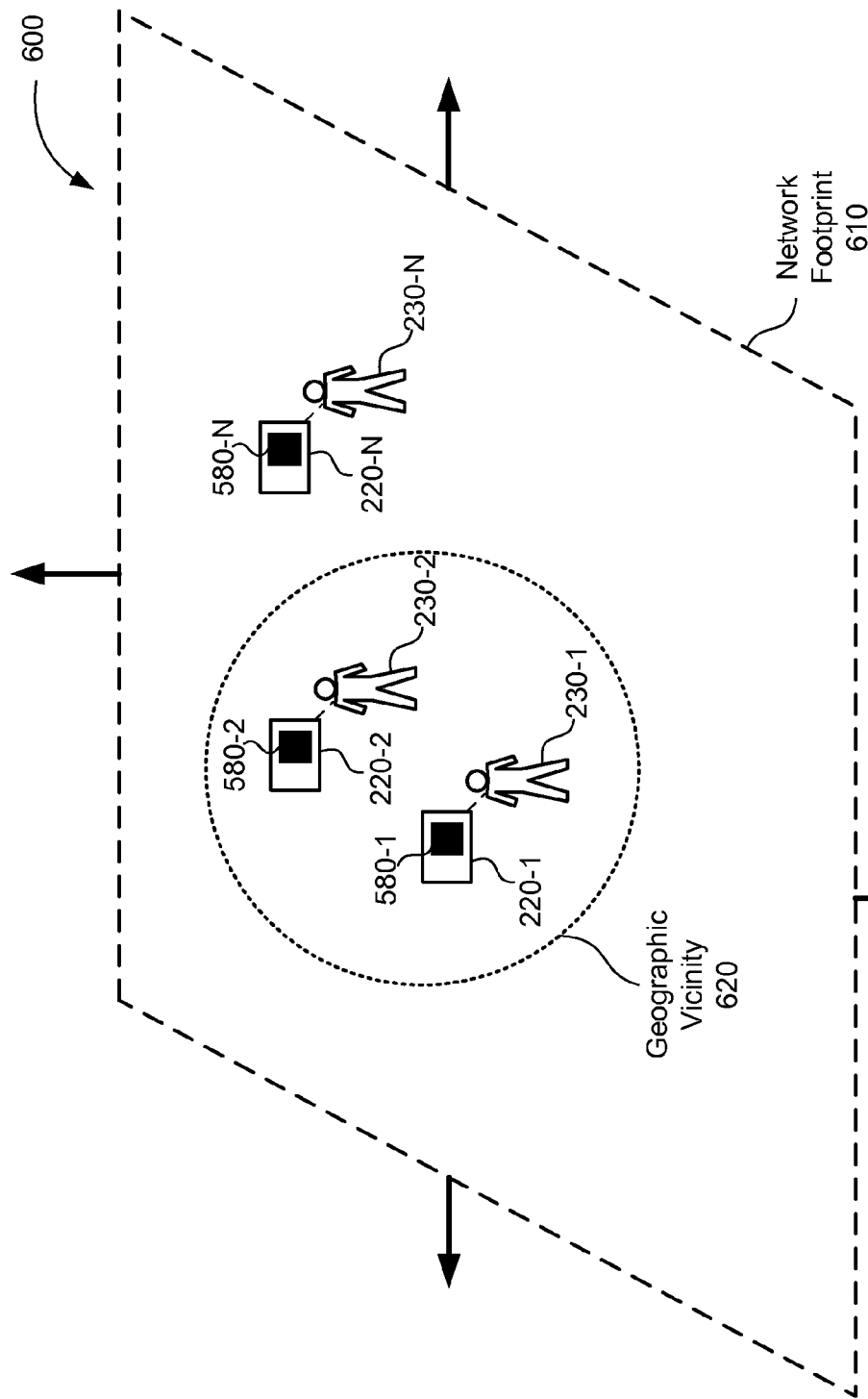
FIG. 6 shows a configuration wherein a plurality of access devices are physically located at different geographic locations within an exemplary network footprint according to principles described herein.

To help facilitate an understanding of a social networking facility 580 operating in mingle mode, FIG. 6 shows a configuration 600 wherein access devices 220-1, 220-2, and 220-N (collectively referred to as "access devices 220") are physically located at different geographic locations within an exemplary network footprint 610. The network footprint 610 refers to a collective geographic space within which access devices 220 are able to receive and transmit network communication signals (e.g., signals to or from a satellite or a broadcast tower). As represented by arrows in FIG. 6, the reach of the network footprint 610 may extend beyond the illustrated portion of the network footprint 610. Additionally, while FIG. 6 illustrates a two-dimensional network footprint 610, it will be understood that the network footprint 610 may be three dimensional in certain implementations.

In some examples, one or more of the access devices 220 shown in FIG. 6 may be mobile devices, such as mobile phones. Hence, the access devices 220 may be capable of being carried or otherwise transported from location to location.

One or more of the access devices 220 shown in FIG. 6 may include a social networking facility (e.g., social networking facilities 580-1 through 580-N, collectively referred to herein as social networking facilities 580). In some examples, a social networking facility 580 operating in mingle mode may be configured to communicate with one or more other social networking facilities 580 in response to a detected geographic location of one or more access devices 220.

To illustrate, social networking facility 580-1 associated with access device 220-1 may be configured to communicate with other social networking facilities 580 residing on other access devices 220 when access device 220-1 is within the same geographic vicinity 620 as the other access devices 220. The boundaries of the geographic vicinity 620 may be user-definable and may include any suitable area as may serve a particular application. For example, the geographic vicinity 620 may include a circle having a radius to be a predetermined distance from the access device 220. Additionally or alternatively, the geographic vicinity 620 may include a particular premises location (e.g., a shopping mall, restaurant, store, meeting place, building, city, etc.). Other boundaries for geographic vicinity 620 may be defined as may serve a particular application.

In the example of FIG. 6, access devices 220-1 and 220-2 are shown to be located within geographic vicinity 620. However, access device 220-N is shown to be located outside of geographic vicinity 620. Hence, while in mingle mode, social networking facility 580-1 may be configured to communicate with social networking facility 580-2 but not with social networking facility 580-N.

To this end, access device 220-1 may be configured to detect when another access device (e.g., access device 220-2) enters into or is otherwise located within geographic vicinity 620. Such detection may be facilitated by GPS or other location detection technologies. For example, each access device 220 shown in FIG. 6 may be configured to provide location data 465 (e.g., GPS coordinates) representative of their respective geographic locations to social networking subsystem 110 in any of the ways described herein. Social networking subsystem 110 may use the location data to determine which access devices 220 are located within the same geographic vicinity 620 as access device 220-1 and transmit this information to access device 220-1. Social networking facility 580-1 may then use the transmitted information to initiate communication with access devices 220 located within the same geographic vicinity 620 as access device 220-1.

Communication between access devices 220-1 and 220-2 located within the same geographic vicinity 620 may be in accordance with any predefined rules as may serve a particular application. These rules may be defined within user profiles corresponding to users 230 of the access devices 220.

A number of exemplary mingle mode communications between access devices 220 located within the same geographic vicinity 620 and rules that govern these communications will now be described in more detail. It will be recognized that the exemplary communications described herein are merely illustrative, and that the access devices 220 within the same geographic vicinity 620 may be configured to perform additional or alternative communications as may serve a particular application.

In some examples, user 230-1 may configure social networking facility 580-1 to identify one or more other social networking facilities 580 located within geographic vicinity 620 that correspond to users 230 who match certain criteria. For example, user 230-1 may be a single man desiring to meet a woman to date. To this end, user 230-1 may define a number of rules within his user profile specifying one or more criteria that he is looking for in a woman. For example, user 230-1 may specify that he would like to meet a woman with certain physical characteristics, educational background, religious preference, and/or work experience.

With such rules defined, social networking facility 580-1 may be configured to communicate with other social networking facilities 580 corresponding to access devices 220 that are located within the same geographic vicinity 620 as user 230-1 and that are associated with users 230 who satisfy the rules. Because access device 220-1 may be mobile, user 230-1 may take social networking facility 580-1 with him as he moves from location to location. In this manner, social networking facility 580-1 may continually search for other social networking facilities 580 corresponding to women that match the specified criteria as the user 230-1 moves from location to location.

When social networking facility 580-1 detects the presence of another social networking facility (e.g., social networking facility 580-2) within the same geographic vicinity 620, social networking facility 580-1 may be configured to communicate with social networking facility 580-2 to determine whether user 230-2 matches the criteria defined by user 230-1. Such communication(s) may include transmission of any suitable data between access devices 220-1 and 220-2 via network 225. In some examples, social networking facility 580-1 may be configured to make the determination of whether user 230-2 matches the criteria defined by user 230-1 by analyzing information contained within a user profile corresponding to user 230-2. The determination may additionally or alternatively be made using any other suitable procedure or heuristic, such as networking facility 580-1 communicating with social networking subsystem 110 to determine from user profile data 450 whether user 230-2 matches the criteria defined by user 230-1.

If user 230-2 does not match the predefined criteria, social networking facility 580-1 may take no further action. However, if user 230-2 does match the predefined criteria, social networking facility 580-1 may be configured to perform one or more predefined actions. For example, social networking facility 580-1 may be configured to coordinate with social networking facility 580-2 to arrange a meeting between user 230-1 and user 230-2, send an email, text message, or other communication to access device 220-2, create a social networking connection between user 230-1 and user 230-2, alert user 230-1 and/or user 230-2 of the potential match via an audible and/or visible indicator (e.g., a message containing information about user 230-2 and why that user 230-2 is a potential match), and/or store contact information corresponding to user 230-2.

In some examples, social networking facility 580-1 may be configured to create a log of the potential match for access by the user 230-1 at a later time. For example, the user 230-1 may currently be in a relationship and not interested in dating other people. However, social networking facility 580-1 may maintain a log of all potential matches that it detects, and the user 230-1 may access these potential matches when he breaks up and becomes interested in dating other people again.

In some examples, social networking facility 580-1 may be configured to communicate with social networking facility 580-2 to locate potential matches with one or more users 230 that are in some way associated with user 230-2. These users 230 may be linked to user 230-2 via one or more social networking connections, specified within a user profile associated with user 230-2, located within an address book or contact list maintained by user 230-2, and/or otherwise associated with user 230-2. To illustrate, social networking facility 580-1 may determine that user 230-2 does not match the criteria defined by user 230-1. However, a friend of user 230-2 may match the criteria defined by user 230-1. In this instance, social networking facility 580-1 may identify the match and notify the user 230-1, send a communication to an access device 220 associated with the potential match, and/or perform any other suitable predefined action.

Another example of how a social networking facility 580 may operate in mingle mode to locate one or more users 230 who match certain criteria is in the context of a business conference. Referring to FIG. 6, user 230-1 may represent a business person attending a business conference. Geographic vicinity 620 may represent the conference center, building, or other geographic area or premises hosting the business conference. In some examples, user 230-1 may desire to meet other attendees of the business conference who meet certain criteria. For example, user 230-1 may desire to network with attendees having certain backgrounds, technical skills, business connections, and/or other attributes. To this end, user 230-1 may define a number of rules specifying the types of people that he would like to meet and how he would like to meet them (e.g., in person, via email, via a phone call, etc.).

With such rules defined, social networking facility 580-1 may be configured to communicate with other social networking facilities 580 corresponding to other users 230 who are also attending the business conference. If social networking facility 580-1 identifies a user (e.g., user 230-2) as matching the predefined criteria, social networking facility 580-1 may be configured to coordinate with social networking facility 580-2 to arrange a meeting between user 230-1 and user 230-2, send an email, text message, or other communication to access device 220-2, create a social networking connection between user 230-1 and user 230-2, alert user 230-1 and/or user 230-2 of the potential match via an audible and/or visible indicator, and/or store contact information corresponding to user 230-2.

In some examples, a social networking facility 580 associated with an access device 220 may be selectively configured to operate in an "entourage mode," wherein the social networking facility 580 is configured to facilitate collaboration among a group of users 230 connected to each other in some manner.

Figure 7:
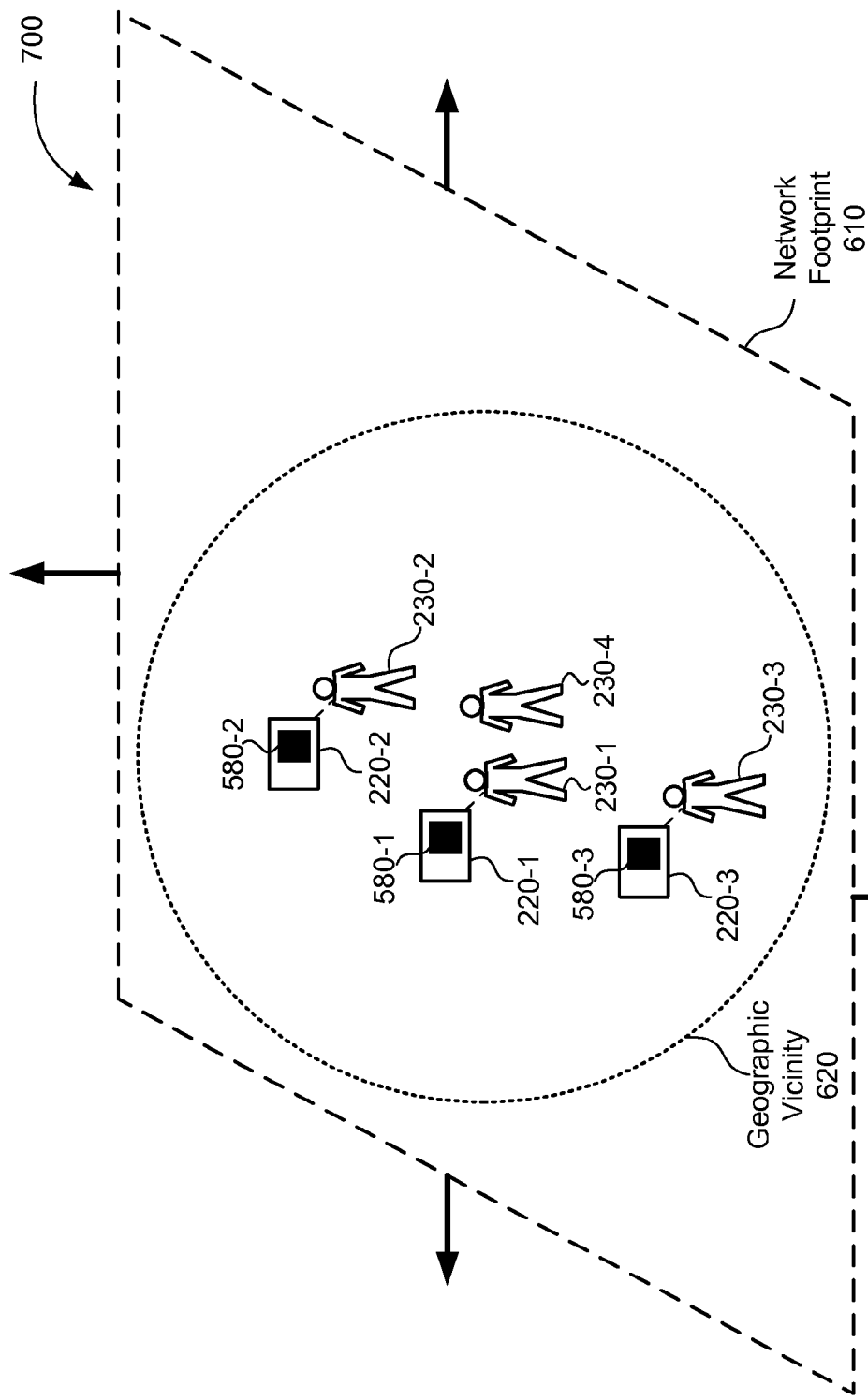
FIG. 7 shows a configuration wherein social networking facilities associated with a plurality of access devices are configured to operate in an entourage mode according to principles described herein.

FIG. 7 shows a configuration 700 wherein social networking facilities 580 associated with a plurality of access devices 220 are configured to operate in entourage mode. As shown in FIG. 7, access devices 220-1, 220-2, and 220-3 corresponding to users 230-1, 230-2, and 230-3, respectively, are located within the same geographic vicinity 620. Geographic vicinity 620 may be located within network footprint 610, as described previously.

In some examples, users 230-1, 230-2, and 230-3 are members of a common group. The group may be specified within group data 460 contained within social network subsystem 110 and may be defined by one or more user profiles associated with the users 230 and/or by one or more social networking connections between the users 230. For example, users 230-1, 230-2, and 230-3 may each specify within his or her user profile that he or she is a member of a particular group. A group may be private and require an invitation and/or approval to add users 230 thereto. Alternatively, a group may be public and allow any user 230 to be added thereto. Any method of adding, removing, and/or otherwise managing members of a group may vary as may serve a particular application.

In entourage mode, status information may be maintained by social network subsystem 110 corresponding to each user 230 that is a member of a particular group. The status information may include, but is not limited to, location data 465 corresponding to each user 230, activity status information (e.g., studying, on a date, working, etc.) corresponding to each user 230, and/or any other information associated with each user 230 as may serve a particular application.

In some examples, the status information maintained by social network subsystem 110 may be provided to one or more members of the group. For example, the status information may be transmitted by social network subsystem 110 to one or more of access devices 220 associated with one or more of the users 230 that are members of the group. The status information may be displayed or otherwise processed by the access devices 220 to facilitate access (e.g., viewing) thereof by the users 230.

In some examples, group chat or other communication mediums may be provided to facilitate communications among the members of the group. For example, each access device 220 corresponding to users 230 within a group may include an application configured to facilitate transmission of SMS or MMS messages to each member of the group. In this manner, collaboration between members of the group may be facilitated.

In some examples, each access device 220 corresponding to a user 230 within a group may be preprogrammed with one or more social interaction codes, which may be transmitted as text, graphics, video, audio and/or any combination thereof to other members of the group. The social interaction codes may be predefined by an access device 220 and/or social network subsystem 110. Additionally or alternatively, one or more of the social interaction codes may be defined by one or more users 230 within the group. Exemplary social interaction codes include, but are not limited to, messages (e.g., "need help avoiding this guy", "need a wingman", "I'm bored", "let's get out of here", etc.), sounds representative of one or more messages or events, icons representative of one or more messages or events, and/or any other information as may serve a particular application.

An access device 220 may include one or more "hotkeys" or other input mechanisms, that, when selected, direct the access device 220 to transmit a predetermined social interaction code to access devices 220 associated with other users 230 within a group. For example, an access device 220 (e.g., a mobile phone) may include a button preprogrammed to transmit a social interaction code such as "I need help" to other access devices 220 when selected.

The use of such hotkeys may be advantageous in situations wherein a user 230 desires to discretely transmit social interaction codes to other users 230. For example, a user 230 conversing with another person may reach into his or her pocket and select a hotkey disposed on a mobile phone to transmit a social interaction code to other users 230 within his or her group without the other person realizing that the user 230 is communicating with other users 230 within the group.

An example of social networking facilities 280 operating in entourage mode is in the context of a social event, such as a party. Referring to FIG. 7, user 230-1 may represent a person attending a social event. Geographic vicinity 620 may represent the room, building, or other geographic area or premises hosting the social event. In some examples, user 230-1 may be conversing with user 230-4, an attorney determined to expound upon the federal rules of civil procedure. User 230-1 may become bored and desire to leave. To this end, user 230-1 may select a hotkey associated with access device 220-1 to transmit a social interaction code such as "get me out of here" to access devices 220 (e.g., access devices 220-2 and 220-3) corresponding to other users 230 within the user's group who are in attendance at the social event. One of these users 230 may then approach users 230-1 and 230-4 and interrupt their conversation in any suitable manner.

In some examples, a social networking facility 580 associated with an access device 220 may be selectively configured to operate in an "arrival mode," wherein the social networking facility 580 is configured to notify other access devices 220 within a geographic area (e.g., geographic vicinity 620) that a user 230 associated with the access device 220 has arrived to the geographic area.

Figure 8:
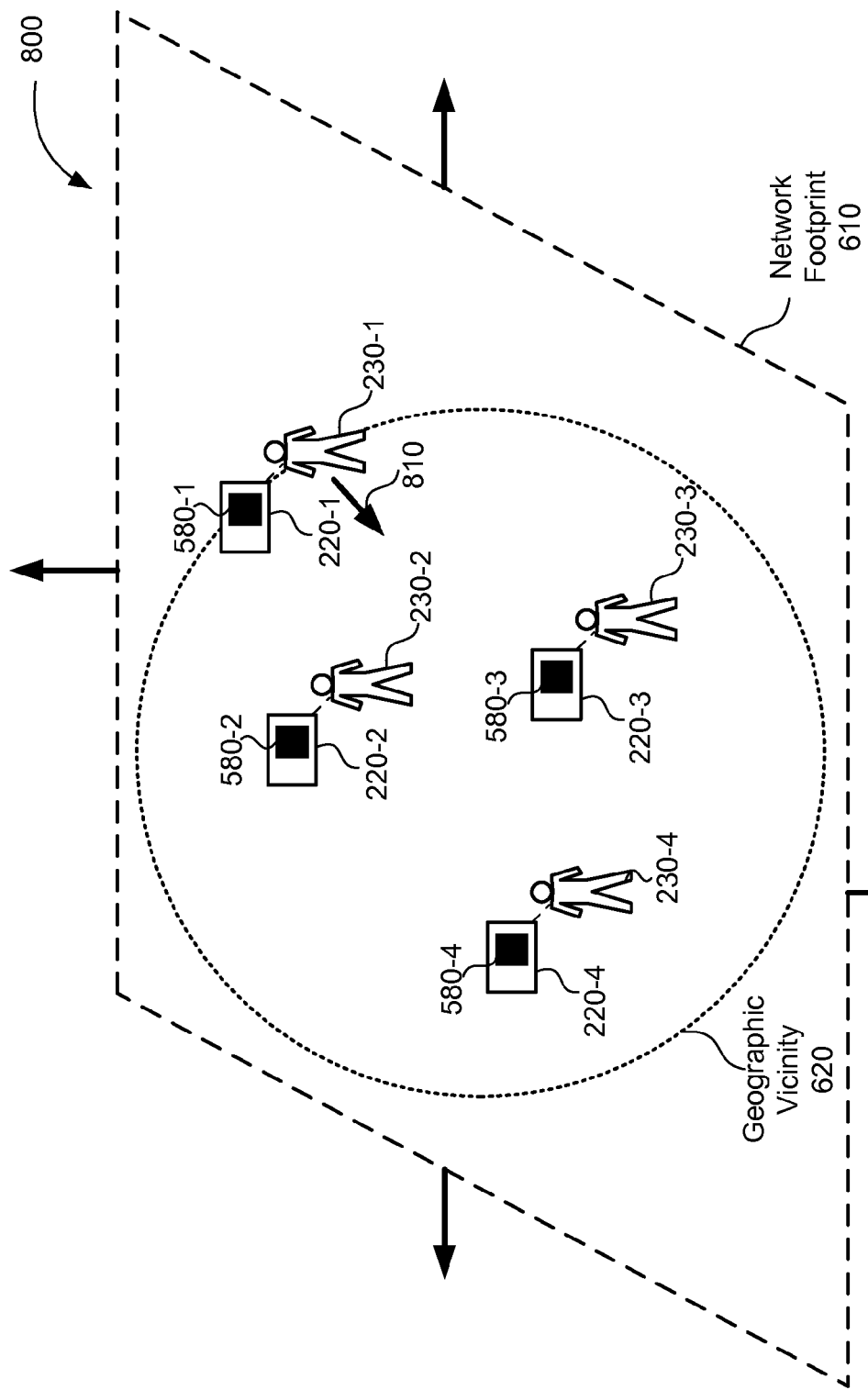
FIG. 8 illustrates a configuration wherein a social networking facility associated with a user is configured to operate in an arrival mode according to principles described herein.

For example, FIG. 8 illustrates a configuration 800 wherein social networking facility 580-1 associated with user 230-1 is configured to operate in an arrival mode. User 230-1 is shown to be geographically located at a border of geographic vicinity 620. As represented by arrow 810, user 230-1 may be in the process of entering geographic vicinity 620. As user 230-1 enters geographic vicinity 620, social networking facility 580-1 may be configured to automatically notify one or more other users (e.g., users 230-2 through 230-4) located within geographic vicinity 620 that user 230-1 has arrived within geographic vicinity 620. For example, social networking facility 580-1 may be configured to transmit one or more sounds, messages, graphics, or other indicators to access devices 220-2 through 220-4 to notify users 230-2 through 230-4 that user 230-1 has arrived within geographic vicinity 620.

In some examples, the arrival notification may be transmitted only to members of a particular group. For example, users 230-1, 230-2, and 230-3 may be members of a particular group of which user 230-4 is not a part. Hence, the arrival notification may be transmitted to users 230-2 and 230-3, and not to user 230-4.

In some examples, a social networking facility 580 associated with an access device 220 may be selectively configured to operate in a "secret friends mode," wherein the social networking facility 580 is configured to disguise the identity of one or more users 230 (referred to herein as "secret friends") virtually connected to a particular user (e.g., user 230-1) such that only the user 230-1 knows the true identities of the secret friends. In this manner, other friends of the user 230-1 and/or other users 230 having access to the user's access device 220-1 may be prevented from seeing or otherwise discovering that the user 230-1 is associated with the secret friends.

The identity of a user 230 designated as a secret friend may be disguised in any suitable manner. For example, social networking facility 280 may be configured to hide identifying information corresponding to the secret friend within a friends list or contact list associated with the user 230-1. Communications to and from a secret friend may be rendered using a disguised (e.g., fictionalized) name, telephone number, email address, picture, or other identifier known only to user 230-1 to represent the secret friend.

In some examples, user 230-1 may designate another user 230 as a secret friend by modifying a user profile corresponding to the user 230-1. To this end, access subsystem 120 may be configured to provide one or more interfaces (e.g., GUIs) configured to facilitate modification of a user profile corresponding to a particular user (e.g., user 230-1) in order to designate one or more users 230 associated with user 230-1 as secret friends.

Figure 9:
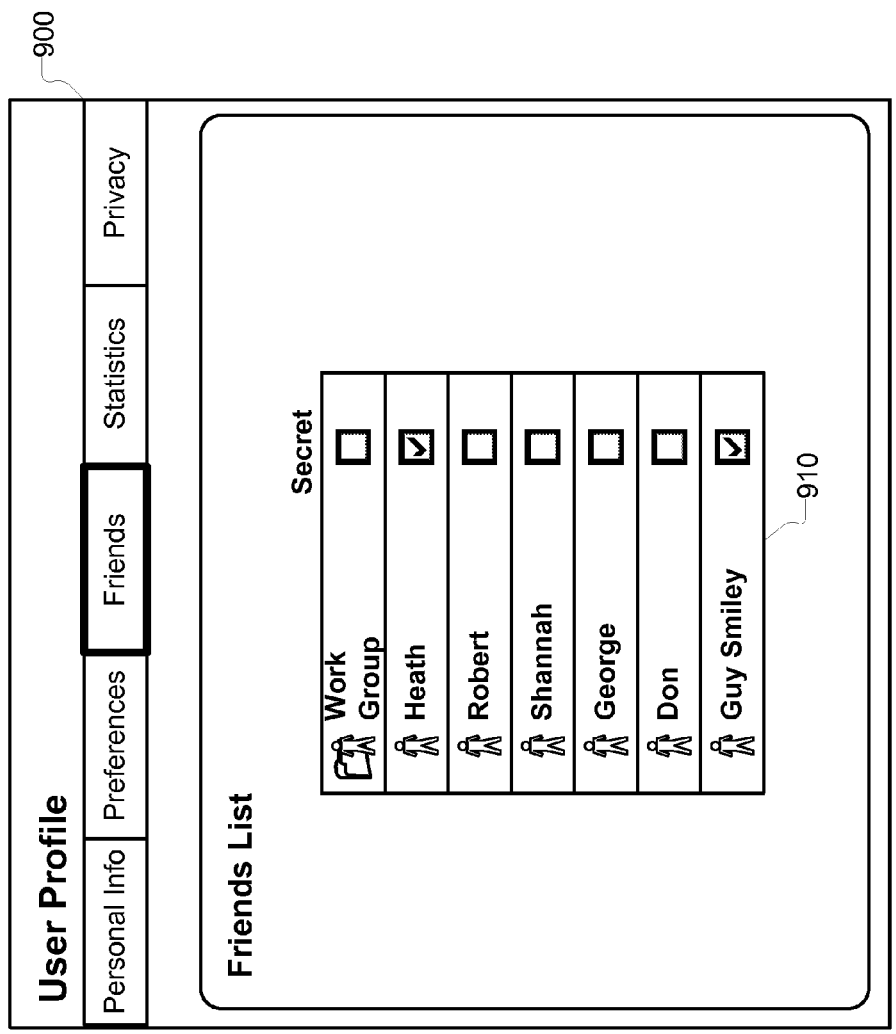
FIG. 9 illustrates an exemplary graphical user interface that may be provided by access subsystem to facilitate designation of one or more users as secret friends according to principles described herein.

FIG. 9 illustrates an exemplary GUI 900 that may be provided by access subsystem 120 to facilitate designation of one or more users 230 as secret friends. As shown in FIG. 9, a list of users 910 may be displayed within GUI 900. In some examples, the list 910 includes names of individual users (e.g., "Heath", "Robert", "Shannah", "George", "Don", and "Guy Smiley") and/or names of groups of users (e.g., "work group"). Each user and/or group of users may be designated as secret friends by selecting an appropriate checkbox. For example, FIG. 9 shows that users "Heath" and "Guy Smiley" have been designated as secret friends. One or more additional GUIs may be displayed to configure the disguised identifiers for these users 230 as may serve a particular application.

As an example, an exemplary user 230 who may desire to designate one or more other users as 230 as secret friends may be a high school girl. In this case, the student may not want others in her social group to know she has a friend relationship with a boy outside the social group. The girl can designate the boy as a secret friend in her user profile such that the name of the boy is not visible to others viewing the girl's friends list. Incoming communications from the boy may be altered to appear as though they came from another person.

In some examples, a social networking facility 580 may be configured to operate in one or more modes simultaneously. For example, a social networking facility 580 may be configured to simultaneously operate in both entourage and arrival modes. Any other combination of modes may be used by social networking facility 580 as may serve a particular application.

Figure 10:
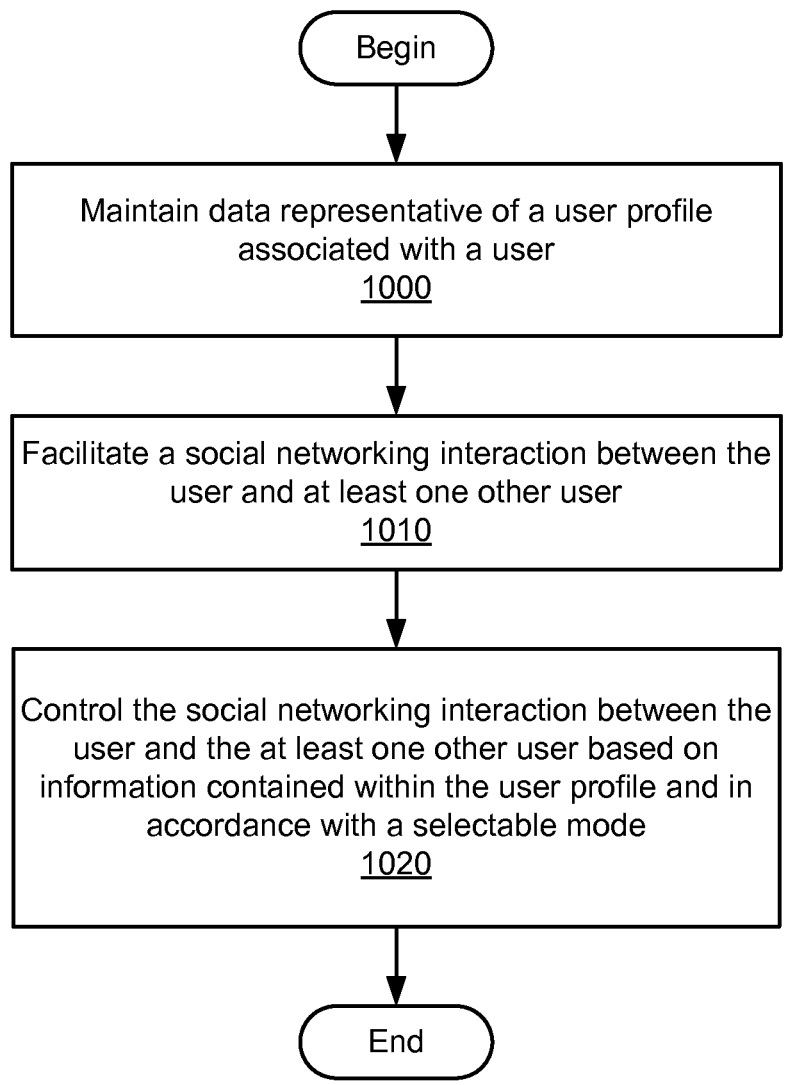
FIG. 10 illustrates an exemplary social networking interaction method according to principles described herein.

FIG. 10 illustrates an exemplary social networking interaction method. While FIG. 10 illustrates exemplary steps according to one embodiment, other embodiments may omit, add to, reorder, and/or modify any of the steps shown in FIG. 10.

In step 1000, data representative of a user profile associated with a user is maintained. The user profile data may be maintained in any of the ways described herein.

In step 1010, a social networking interaction between the user and at least one other user is facilitated. The social networking interaction may be facilitated in any of the ways described herein.

In step 1020, the social networking interaction between the user and the at least one other user is controlled based on information contained within the user profile and in accordance with a selectable mode. The selectable mode may include, but are not limited to, a mingle mode, an entourage mode, an arrival mode, and/or a secret friends mode.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
   maintaining, by at least one computing device, data representative of a user profile associated with a first user of a first mobile device;
   detecting, by the at least one computing device, that the first mobile device and a second mobile device associated with a second user are located in a geographic vicinity;
   determining, by the at least one computing device in response to the detecting that the first mobile device and the second mobile device are located in the geographic vicinity, that the second user matches at least one criterion defined within the user profile associated with the first user; and
   automatically storing, by the at least one computing device in response to the determining, contact information corresponding to the second user.

2. The method of claim 1, further comprising performing, by the at least one computing device in response to the determining, at least one of coordinating a meeting between the first user and the second user, attempting to establish one or more social networking connections between the first user and the second user, and alerting the first user that the second user matches the at least one criterion.

3. The method of claim 1, further comprising facilitating, by the at least one computing device, a transmission of a social interaction code from the first mobile device associated with the first user to the second mobile device associated with the second user.

4. The method of claim 3, further comprising detecting, by the at least one computing device, a selection by the first user of a hotkey included within the first mobile device and associated with the social interaction code, wherein the hotkey comprises a button preprogrammed to transmit the social interaction code in response to user selection of the button.

5. The method of claim 3, wherein the social interaction code comprises at least one of text content, graphics content, video content, and audio content.

6. The method of claim 1, wherein the at least one criterion comprises at least one dating criterion, and wherein the automatically storing the contact information comprises creating a log of a potential dating match between the first user and the second user for access by the first user.

7. The method of claim 1, wherein the user profile defines the first user as a member of an entourage that also includes a third user associated with a third mobile device, and wherein the method further comprises:
detecting, by the at least one computing device, that the first and third mobile devices are located in the geographic vicinity; and
automatically facilitating, by the at least one computing device in response to the detecting that the first and third mobile devices are located in the geographic vicinity and in accordance with the user profile, collaboration between the first user and the third user.

8. A method comprising:
maintaining, by a first mobile device, data representative of a user profile associated with a first user of the first mobile device, the user profile defining the first user as a member of an entourage that also includes a second user associated with a second mobile device;
detecting, by the first mobile device, that the first and second mobile devices are located in a geographic vicinity;
detecting, by the first mobile device while the first and second mobile devices are located in the geographic vicinity, a selection by the first user of a hotkey included within the first mobile device and associated with a social interaction code; and
transmitting, by the first mobile device in response to the selection by the first user of the hotkey and based on the user profile defining the first user as the member of the entourage that also includes the second user, the social interaction code to the second mobile device.

9. The method of claim 8, further comprising:
detecting, by the first mobile device, that the first mobile device and a third mobile device associated with a third user are located in the geographic vicinity;
determining, by the first mobile device in response to the detecting that the first mobile device and the third mobile device are located in the geographic vicinity, that the third user matches at least one criterion defined within the user profile associated with the first user; and
facilitating, by the first mobile device in response to the determining, a social networking interaction between the first and third users.

10. The method of claim 9, wherein the facilitating of the social networking interaction between the first and third users comprises at least one of coordinating a meeting between the first user and the third user, attempting to establish one or more social networking connections between the first user and the third user, alerting the first user that the third user matches the at least one criterion, and automatically storing contact information corresponding to the third user.

11. The method of claim 8, wherein the user profile defines the first user as a member of a group that also includes a third user associated with a third mobile device, and wherein the method further comprises:
detecting, by the first mobile device, that the third mobile device is located in another geographic vicinity;
detecting, by the first mobile device, an entrance of the first mobile device into the another geographic vicinity; and
transmitting, by the first mobile device in response to the detecting of the entrance of the first mobile device into the another geographic vicinity, an arrival notification to the third mobile device, the arrival notification configured to notify the third user of an entrance of the first user into the another geographic vicinity.

12. The method of claim 8, wherein the user profile designates a third user associated with a third mobile device as a secret friend of the first user, and wherein the method further comprises disguising, by the first mobile device, an identity of the third user on a display of the first mobile device.

13. The method of claim 8, wherein the social interaction code comprises at least one of text content, graphics content, video content, and audio content.

14. A system comprising:
at least one computing device that
maintains data representative of a user profile associated with a first user of a first mobile device,
detects that the first mobile device and a second mobile device associated with a second user are located in a geographic vicinity,
determines, in response to the detection that the first mobile device and the second mobile device are located in the geographic vicinity, that the second user matches at least one criterion defined within the user profile associated with the first user, and
automatically stores, in response to the determination, contact information corresponding to the second user.

15. The system of claim 14, wherein the at least one computing device further performs, in response to the determining, at least one of coordinating a meeting between the first user and the second user, attempting to establish one or more social networking connections between the first user and the second user, and alerting the first user that the second user matches the at least one criterion.

16. The system of claim 14, wherein the user profile defines the first user as a member of a group that also includes a third user associated with a third mobile device, and wherein the at least one computing device:
detects that the third mobile device is located in another geographic vicinity and that the first mobile device has entered into the another geographic vicinity; and
transmits, in response to the detection that the first mobile device has entered into the another geographic vicinity, an arrival notification to the third mobile device, the arrival notification configured to notify the third user of an entrance of the first user into the another geographic vicinity.

17. The system of claim 14, wherein the user profile designates a third user associated with a third mobile device as a secret friend of the first user, and wherein the at least one computing device disguises an identity of the third user on a display of the first mobile device.

18. The system of claim 14, wherein the user profile defines the first user as a member of an entourage that also includes a third user associated with a third mobile device, and wherein the at least one computing device:
detects that the first and third mobile devices are located in the geographic vicinity; and
automatically facilitates, in response to the detection that the first and third mobile devices are located in the geographic vicinity and in accordance with the user profile, collaboration between the first user and the third user.

19. The system of claim 14, wherein the at least one computing device further facilitates a transmission of a social interaction code from the first mobile device associated with the first user to the second mobile device associated with the second user.

20. The system of claim 19, wherein the social interaction code comprises at least one of text content, graphics content, video content, and audio content.

* * * * *